United States Patent
Kosaka

(10) Patent No.: US 7,103,266 B2
(45) Date of Patent: Sep. 5, 2006

(54) MPEG DATA RECORDING APPARATUS HAVING IEEE 1394 INTERFACE

(75) Inventor: Hideaki Kosaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1148 days.

(21) Appl. No.: 10/026,543

(22) Filed: Dec. 27, 2001

(65) Prior Publication Data

US 2002/0196462 A1 Dec. 26, 2002

(30) Foreign Application Priority Data

Jun. 22, 2001 (JP) .......................... P2001-189143

(51) Int. Cl.
*H04N 7/26* (2006.01)

(52) U.S. Cl. .................. 386/109; 109/111; 109/112; 109/125; 109/46

(58) Field of Classification Search ............. 386/46, 386/109, 111–112, 125
See application file for complete search history.

(56) References Cited

U.S. PATENT DOCUMENTS

2002/0067915 A1* 6/2002 Shida et al. ............. 386/111
2003/0031468 A1* 2/2003 Ono et al. ............... 386/109

FOREIGN PATENT DOCUMENTS

JP 11-346345 12/1999

* cited by examiner

*Primary Examiner*—Thai Tran
*Assistant Examiner*—Helen Shibru
(74) *Attorney, Agent, or Firm*—Birch, Stewart, Kolasch & Birch, LLP

(57) ABSTRACT

An MPEG data recording apparatus stands by while inputting MPEG data output from an IEEE 1394 interface (1) to an FIFO buffer section (14) and starts to record the MPEG data in the FIFO buffer section (14) at the time of a recording start operation of a user, and records all the MPEG data which have already been input into the FIFO buffer section (14) at the time of a recording stop operation of the user and then stops the recording operation. Obtained is the MPEG data recording apparatus capable of quickly responding to the recording start operation and the recording stop operation of the user when recording the MPEG data input through the IEEE 1394 interface by the recording operation of the user.

8 Claims, 8 Drawing Sheets

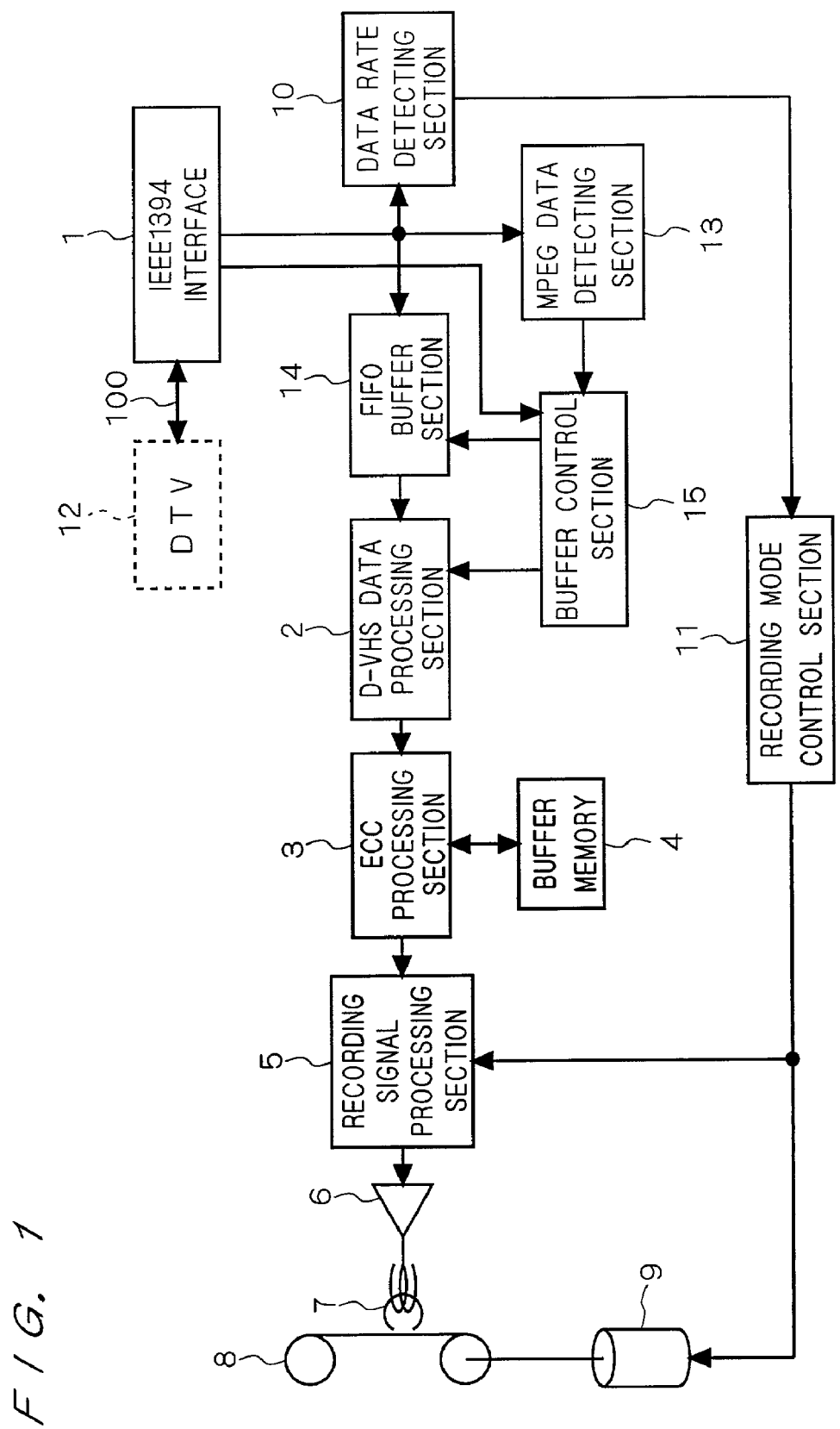
F I G. 1

F I G. 2
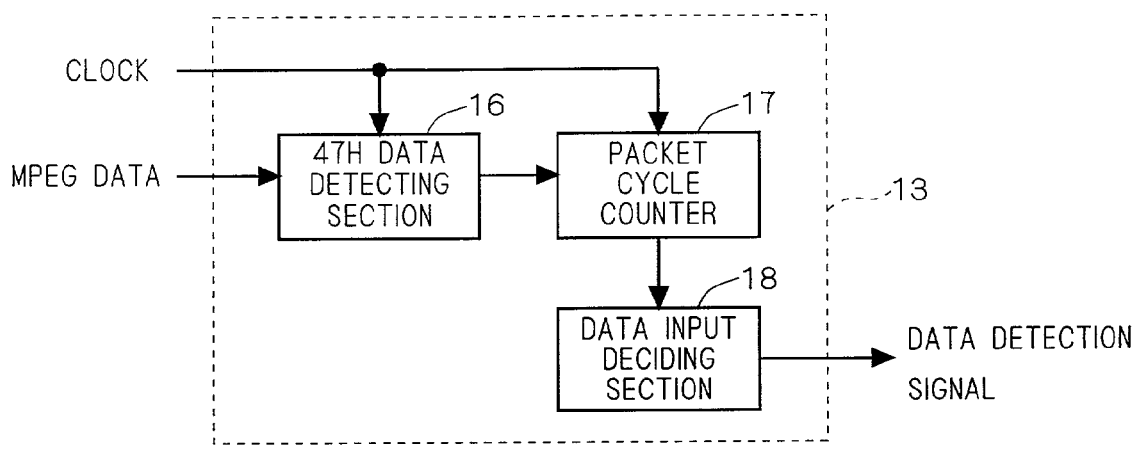

MPEG DATA RECORDING APPARATUS HAVING IEEE 1394 INTERFACE

BACKGROUND OF THE INVENTION

1. Field of the Invention

The present invention relates to an MPEG data recording apparatus such as a digital VTR, and more particularly to record control of MPEG data (which will hereinafter imply MPEG-TS data or MPEG-PTS data) input from the outside through an IEEE 1394 interface circuit (which will be hereinafter referred to as an IEEE 1394 interface).

2. Description of the Background Art

A conventional MPEG data recording apparatus will be described with reference to FIG. 8 by taking a D-VHS apparatus as an example.

FIG. 8 is a block diagram (prior art) selectively showing a portion to be operated in a system of a D-VHS apparatus when MEPG data input through an IEEE 1394 network are to be recorded.

In FIG. 8, the reference numeral 1 denotes an IEEE 1394 interface (a serial interface circuit having the function of real time transmission) connected to a DTV (Digital TV) 12 through an IEEE 1394 network 100. The IEEE 1394 interface 1 exchanges asynchronous data such as an AV/C command and isochronous data such as an MPEG-partial transport stream (PTS) or an MPEG-transport stream (TS) together with the DTV 12. The reference numeral 2 denotes a D-VHS data processing section or a data recording section for fetching the MPEG data output from the IEEE 1394 interface 1, converting the fetched MPEG data into data having a D-VHS data format and recording the same data. The reference numeral 3 denotes an ECC processing section for adding an error correction code (ECC) to the D-VHS data converted through the D-VHS data processing section 2. The reference numeral 4 denotes a buffer memory for temporarily storing the D-VHS data during an ECC processing. The reference numeral 5 denotes a recording signal processing section for D/A converting the D-VHS data having the ECC added thereto in the ECC processing section 3 into a recording signal which can be recorded on a magnetic tape. The reference numeral 6 denotes a recording amplifier for amplifying the recording signal and the reference numeral 7 denotes a recording head for recording the amplified recording signal on the magnetic tape. The reference numeral 8 denotes a magnetic tape on which the recording signal is to be recorded and the reference numeral 9 denotes a motor driver for regulating a running speed of the magnetic tape 8. The reference numeral 10 denotes a data rate detecting section for detecting a data volume (data rate) input per unit time based on the MPEG data output from the IEEE 1394 interface 1. The reference numeral 11 denotes a recording mode control section for adaptively switching a recording mode to control both sections 5 and 9 based on the data rate of the input MPEG data which is detected by the data rate detecting section 10. A portion including these components 1 to 11 constitutes a part of the MPEG data recording apparatus.

The reference numeral 12 denotes an external digital television (DTV) to be connected to the MPEG data recording apparatus through the IEEE 1394 network 100.

The operation of the conventional MPEG data recording apparatus will be described below. First of all, distributed MPEG data to be input from the DTV 12 into the D-VHS apparatus through the IEEE 1394 network 100 are received by the IEEE 1394 interface 1, and the IEEE 1394 interface 1 recomposes the MPEG data thus received and sends the recomposed MPEG data to the D-VHS data processing section 2 and the data rate detecting section 10.

Next, the D-VHS data processing section (data recording section) 2 converts the received MPEG data into data having a data format in conformity with a D-VHS standard, and realigns and records the data, and outputs the recorded D-VHS data to the ECC processing section 3.

Next, the ECC processing section 3 once stores the MPEG data (D-VHS data) converted to have the data format of the D-VHS standard in the buffer memory 4, and then adds an error correction code to the D-VHS data read from the buffer memory 4 and outputs the D-VHS data having the error correction code added thereto to the recording signal processing section 5.

Then, the recording signal processing section 5 carries out a partial response signal processing (PRML: Partial Response Maximum Likelihood) for recording the received D-VHS data on a magnetic tape for the D-VHS data, and outputs the D-VHS data subjected to the PRML processing as a recording signal to the recording amplifier 6.

The recording amplifier 6 amplifies the received recording signal and outputs the amplified recording signal to the magnetic head 7. The magnetic head 7 records the amplified recording signal thus received onto the magnetic tape 8.

On the other hand, the data rate detecting section 10 detects the data rate of input data based on the received MPEG data and transmits the result of the detection to the recording mode control section 11. Consequently, the recording mode control section 11 selects a proper recording mode which is sufficient for recording the input data and can minimize an amount of tape consumption based on the result of the recording mode detection, and carries out control for recording in the recording mode thus selected, that is, control of a tape running speed through the motor driver 9 and control of a recording signal format through the recording signal processing section 5, header data and the like.

FIG. 9 is a conceptual diagram (prior art) showing an example of a communication to be carried out between the DTV 12 and the MPEG data recording apparatus in the case in which a user performs a recording operation by using a control panel display on a screen of the DTV 12.

As shown in FIG. 9, in the case in which the user is to operate the DTV 12 to record, in the MPEG data recording apparatus, a digital broadcast (MPEG data) which is being received, he (she) first establishes a connection between the DTV 12 and the MPEG data recording apparatus through the IEEE 1394 network 100 by using the control panel display provided in the DTV 12. In general, when the IEEE 1394 connection is established between both apparatuses, an input/output path related to isochronous data (a channel for isochronous data on the IEEE 1394) is formed therebetween and the DTV 12 immediately starts to deliver, to its own output path, the MPEG data which are being received. As a result, the IEEE 1394 interface 1 receives the MPEG data which are being delivered.

In this stage, however, the MPEG data recording apparatus does not start the recording operation. The user carries out the recording operation (press-down of a recording button or the like) through the control panel display or the like after the establishment of the IEEE 1394 connection, and the MPEG data recording apparatus then starts the recording operation.

The recording operation of the user is basically carried out through transmission of a recording control code using a path for asynchronous data on the IEEE 1394 network 100. Before or after the transmission of the recording control code itself, a communication for confirming mutual states and situations is carried out between the MPEG data recording apparatus and the DTV 12. The reason is that whether a recording medium is inserted in the MPEG data recording apparatus or whether the MPEG data recording apparatus can be switched into a recording operation is to be confirmed before switching into the recording operation, for example. In order to carry out a series of confirming operations, some time lag is generated before the recording operation is actually started after the user carries out the recording operation (the press-down of the recording button or the like).

As described above, in the conventional MPEG data recording apparatus, it is necessary to take a processing time for a communication through the exchange of control data or the like after the user manipulates to carry out recording with intention. Therefore, there is a problem in that the recording operation can be started with some time delay.

SUMMARY OF THE INVENTION

A first aspect of the present invention is directed to an MPEG data recording apparatus comprising an IEEE 1394 interface having an input terminal connected to an external device and serving to receive MPEG data output from the external device and a recording control code output from the external device with delay after receiving the MPEG data and to output at least the MPEG data and the recording control code from an output terminal, an MPEG data detecting section having an input terminal connected to the output terminal of the IEEE 1394 interface and serving to detect that the MPEG data are present validly or not and to output a data detection signal from an output terminal thereof when the MPEG data are present validly, an FIFO buffer section having an input terminal connected to the output terminal of the IEEE 1394 interface and a control terminal and serving to temporarily store the MPEG data, a data recording section having an input terminal connected to an output terminal of the FIFO buffer section and a control terminal and serving to record the MPEG data output from the FIFO buffer section, and a buffer control section having an input terminal connected to the output terminal of the IEEE 1394 interface and the output terminal of the MPEG data detecting section, and serving to output a signal for giving a command for starting an FIFO operation to the control terminal of the FIFO buffer section and to output a signal for giving a command for stopping a recording operation to the control terminal of the data recording section in response to receipt of the data detection signal, and to output a signal for giving a command for reading the MPEG data to the control terminal of the FIFO buffer section and to output a signal for giving a command for starting the recording operation to the control terminal of the data recording section in response to receipt of the recording control code.

A second aspect of the present invention is directed to the MPEG data recording apparatus according to the first aspect of the present invention, wherein the IEEE 1394 interface also receives and outputs a recording stop control code output from the external device with delay after receiving the recording control code, and the buffer control section outputs: (i) a signal to the control terminal of the FIFO buffer section, in response to the receipt of the recording stop control code, for giving a command for stopping the FIFO operation after outputting all the MPEG data which have been stored in the FIFO buffer section when receiving the recording stop control code to the input terminal of the data recording section; and (ii) a signal to the control terminal of the data recording section, in response to the receipt of the recording stop control code, for giving a command for stopping the recording operation after recording all the MPEG data which have been stored in the FIFO buffer section when receiving the recording stop control code.

A third aspect of the present invention is directed to the MPEG data recording apparatus according to the second aspect of the present invention, wherein the IEEE 1394 interface generates a clock to be a reference of the MPEG data and outputs the clock together with the MPEG data from the output terminal, and the MPEG data detecting section receives the MPEG data and the clock and detects the MPEG data synchronously with the clock, thereby detecting that a specific data pattern appears every constant cycle or not and outputting the data detection signal when the specific data pattern appears.

A fourth aspect of the present invention is directed to the MPEG data recording apparatus according to the second aspect of the present invention, wherein the IEEE 1394 interface generates an MPEG data valid signal indicating that a received signal is the MPEG data and outputs the MPEG data valid signal together with the MPEG data from the output terminal, and the MPEG data detecting section detects that the MPEG data are present validly or not based on the MPEG data valid signal thus received.

A fifth aspect of the present invention is directed to the MPEG data recording apparatus according to the second aspect of the present invention, wherein the MPEG data detecting section detects presence of a signal synchronous with the MPEG data and a state in which the synchronizing signal appears every constant cycle, thereby deciding that the MPEG data are present validly to output the data detection signal.

A sixth aspect of the present invention is directed to the MPEG data recording apparatus according to the second aspect of the present invention, further comprising: a data rate detecting section having an input terminal connected to the output terminal of the IEEE 1394 interface and serving to detect a data volume to be input per unit time as data rate information from the MPEG data, wherein the input terminal of the buffer control section is also connected to an output terminal of the data rate detecting section, the buffer control section has a delay time for which a user operates a control panel on the external device to issue a command for a recording start operation and the buffer control section then receives the recording control code, and the buffer control section multiplies the delay time by the data rate information to calculate a data volume to be stored and updated in the FIFO buffer section and determines addresses of a read pointer and a write pointer of the FIFO buffer section based on the data volume thus calculated, thereby setting the determined addresses to the FIFO buffer section in response to receipt of the data detection signal and the data rate information.

A seventh aspect of the present invention is directed to an MPEG data recording apparatus comprising an IEEE 1394 interface having an input terminal connected to an external device and serving to receive MPEG data output from the external device and a recording control code output from the external device with delay after receiving the MPEG data and to output at least the MPEG data and the recording control code from an output terminal, MPEG data detecting means, having an input terminal connected to the output terminal of the IEEE 1394 interface, for detecting that the MPEG data are present validly or not and for outputting a data detection signal from an output terminal thereof when the MPEG data are present validly, FIFO buffer means, having an input terminal connected to the output terminal of the IEEE 1394 interface and a control terminal, for temporarily storing the MPEG data, data recording means, having an input terminal connected to an output terminal of the FIFO buffer means and a control terminal, for recording the MPEG data output from the FIFO buffer means, and buffer control means, having an input terminal connected to the output terminal of the IEEE 1394 interface and the output terminal of the MPEG data detecting means, for outputting a signal for giving a command for starting an FIFO operation to the control terminal of the FIFO buffer means and outputting a signal for giving a command for stopping a recording operation to the control terminal of the data recording means in response to receipt of the data detection signal, and to output a signal for giving a command for reading the MPEG data to the control terminal of the FIFO buffer means and to output a signal for giving a command for starting the recording operation to the control terminal of the data recording means in response to receipt of the recording control code.

An eighth aspect of the present invention is directed to the MPEG data recording apparatus according to the seventh aspect of the present invention, wherein the IEEE 1394 interface also receives and outputs a recording stop control code output from the external device with delay after receiving the recording control code, and the buffer control means outputs: (i) a signal to the control terminal of the FIFO buffer means, in response to the receipt of the recording stop control code, for giving a command for stopping the FIFO operation after outputting all the MPEG data which have been stored in the FIFO buffer means when receiving the recording stop control code to the input terminal of the data recording means; and (ii) a signal to the control terminal of the data recording means, in response to the receipt of the recording stop control code, for giving a command for stopping the recording operation after recording all the MPEG data which have been stored in the FIFO buffer means when receiving the recording stop control code.

Since the present invention has the above-mentioned structure, the following advantages can be obtained.

According to the first aspect of the present invention, detected are the MPEG data to be output from the IEEE 1394 interface by establishment of an IEEE 1394 connection. As a result, in the case in which it is detected that the MPEG data to be input are present validly, the MPEG data are input into the FIFO buffer section to wait for the recording control code to be output from the IEEE 1394 interface irrespective of the recording start operation of the user. When the IEEE 1394 interface is to receive and output the recording control code output from the external device after the user carries out the recording start operation, the recording is started based on the data in the FIFO buffer section which are previously stored. Therefore, it is possible to obtain an advantage that the MPEG data can be started to be recorded when the user carries out the recording start operation or in the vicinity thereof.

According to each of the second to fifth aspects of the present invention, when the IEEE 1394 interface is to receive and output the recording stop control code output from the external device through the recording stop operation of the user, the MPEG data which have already been input into the FIFO buffer section at the time of the recording stop operation are recorded and the recording operation is then stopped. Therefore, it is possible to obtain an advantage that the record of the MPEG data can be stopped when the user carries out the recording stop operation or in the vicinity thereof.

According to the sixth aspect of the present invention, the MPEG data recording apparatus detects the data rate of the MPEG data output from the IEEE 1394 interface and multiplies the detected data rate by the delay time from the assumed or estimated recording operation of the user to the actual operation in response to the input of the data detection signal. Thus, the data volume to be stored in the FIFO buffer section is variable. Consequently, it is possible to obtain an advantage that the operation for recording the MPEG data and the operation for stopping the recording can be carried out at a time which is much closer to the time of the recording operation of the user.

In order to solve the above-mentioned problems, it is an object of the present invention to provide an MPEG data recording apparatus capable of starting a recording operation as quickly as possible when a user has intention to carry out recording.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a structure of an MPEG data recording apparatus according to first to third embodiments of the present invention, FIG. 2 is a block diagram showing a structure of an MPEG data detecting section according to the first embodiment of the present invention.

DESCRIPTION OF THE PREFERRED EMBODIMENTS

Figure 3:
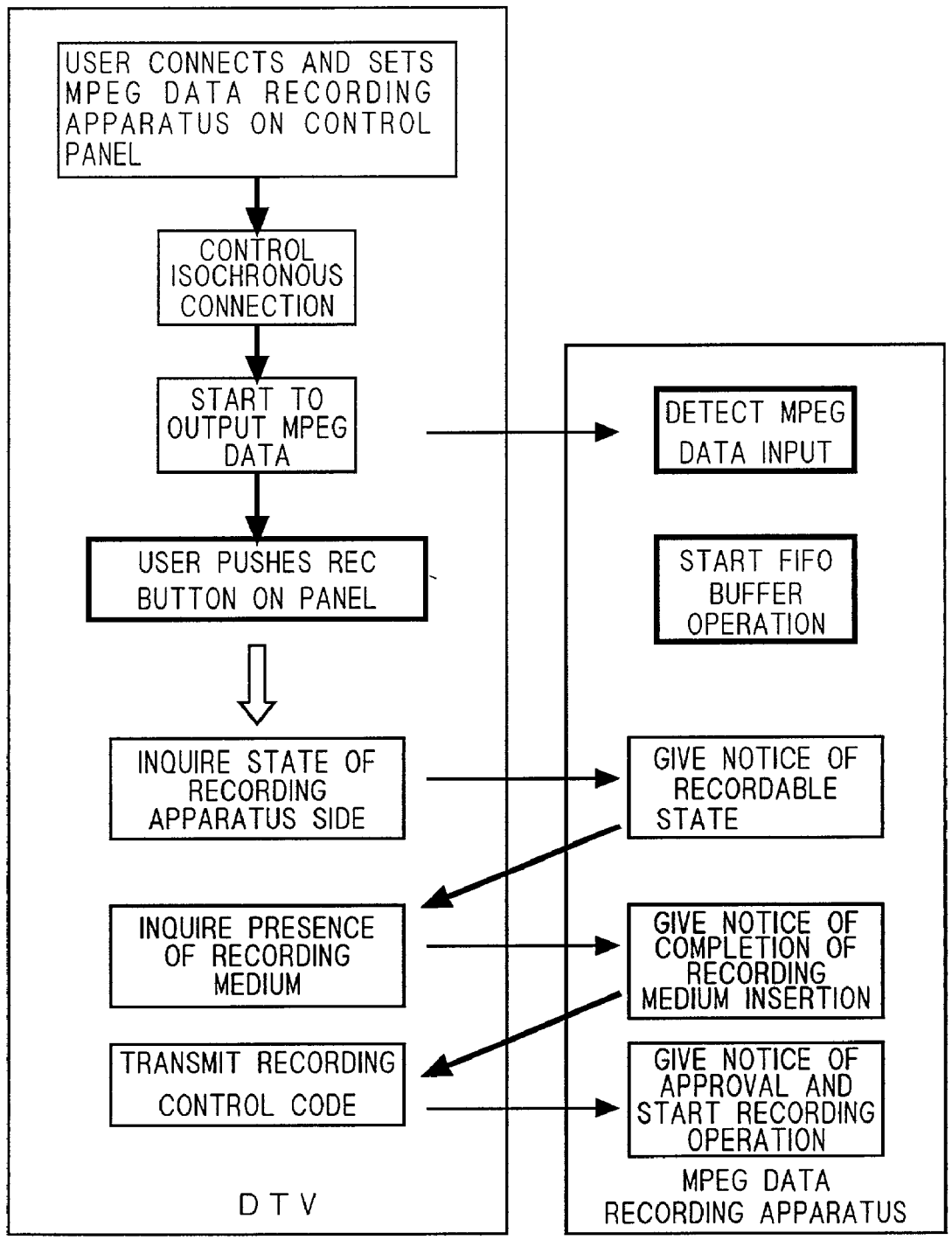
FIG. 3 is a conceptual diagram showing control of the MPEG data recording apparatus through a user operation according to the first to fourth embodiments of the present invention.

Preferred embodiments of the present invention will be specifically described below with reference to the drawings.

First Embodiment

The structure and operation of an MPEG data recording apparatus according to a first embodiment of the present invention will be described with reference to FIGS. 1 to 3.

FIG. 1 is a block diagram showing the structure of the MPEG data recording apparatus according to the present embodiment. A D-VHS apparatus will be described as an example of the MPEG data recording apparatus, and furthermore, the case in which a satellite mode (DVB) is applied will be described as an example of a system. In FIG. 1, the same reference numerals 1 to 12 as those in FIG. 8 denote the same components. In comparison of FIG. 1 with FIG. 8, the present embodiment is characterized in that an MPEG data detecting section 13, an FIFO buffer section 14 and a buffer control section 15 are provided.

First of all, an IEEE 1394 interface 1 has an input terminal connected to a DTV 12 to be an external device through an IEEE 1394 network 100, and receives MPEG data output and distributed from the DTV 12, recomposes the MPEG data thus received and outputs the recomposed MPEG data from an output terminal thereof. Moreover, the IEEE 1394 interface 1 receives a recording control code output from the DTV 12 with delay after the receipt of the MPEG data, and outputs the recording control code thus received from the output terminal thereof. Furthermore, the IEEE 1394 interface 1 also generates a clock (reference clock) to be a reference of the recomposed MPEG data and outputs the same clock from the output terminal thereof.

On the other hand, the MPEG data detecting section 13 has an input terminal connected to the output terminal of the IEEE 1394 interface 1, and receives the MPEG data and the clock which are output from the IEEE 1394 interface 1, detects that the MPEG data are effectively present or not based on the MPEG data and the clock, and outputs a 1-bit data detection signal from an output terminal thereof when the MPEG data are effectively present. In other words, the MPEG data detecting section 13 detects that a specific data pattern appears every constant cycle based on the MPEG data and the clock, and more specifically, detects that an isochronous byte 47H signal (8-bit signal) appears every cycle (188 bytes) of the MPEG data packet, thereby detecting the presence of the actually input MPEG data.

The FIFO buffer section 14 has an input terminal connected to the output terminal of the IEEE 1394 interface 1 and a control terminal for receiving a first control signal output from the buffer control section 15, and has the function of temporarily storing the MPEG data output from the IEEE 1394 interface 1 under control of write/read through the first control signal.

A data recording section or a D-VHS signal processing section 2 has an input terminal connected to an output terminal of the FIFO buffer section 14 and a control terminal for receiving a second control signal output from the buffer control section 15, and records the temporarily stored MPEG data output from the FIFO buffer section 14 under control of start/stop of a recording operation through the second control signal.

The buffer control section 15 has the function of controlling to clear the FIFO buffer section 14 and to start and stop an FIFO operation based on a level of the data detection signal output from the MPEG data detecting section 13, and controlling the input of the MPEG data to the D-VHS signal processing section 2. More specifically, the buffer control section 15 has a first input terminal connected to the output terminal of the IEEE 1394 interface 1 and a second input terminal connected to an output terminal of the MPEG data detecting section 13, and (a) outputs a first control signal for giving a command for executing the clear operation and starting the FIFO operation (the write of the MPEG data) to the control terminal of the FIFO buffer section 14 and outputs a second control signal for giving a command for stopping a recording operation to the control terminal of the data recording section 2 in response to an input timing of the received data detection signal when a level of the same data detection signal indicates that the MPEG data are effectively present. In addition, (b) when receiving a recording control code, the buffer control section 15 outputs a first control signal for giving a command for reading the temporarily stored MPEG data to the control terminal of the FIFO buffer section 14 and outputs a second control signal for giving a command for starting the recording operation of the temporarily stored MPEG data output from the FIFO buffer section 14 to the control terminal of the data recording section 2 in response to the input timing of the recording control code. Furthermore, (c) when receiving a recording stop control code, the buffer control section 15 outputs, to the control terminal of the FIFO buffer section 14, a first control signal for giving a command for outputting, to the input terminal of the data recording section 2, all the MPEG data which have been temporarily stored in the FIFO buffer section 14 when receiving the recording stop control code and for then stopping the FIFO operation, and outputs, to the control terminal of the data recording section 2, a second control signal for giving a command for recording all the MPEG data which have been temporarily stored in the FIFO buffer section 14 when receiving the recording stop control code and for then stopping the recording operation in response to an input timing of the recording stop control code.

FIG. 2 is a block diagram showing an internal structure of the MPEG data detecting section 13 in FIG. 1. As shown in FIG. 2, the MPEG data detecting section 13 includes a 47H data detecting section 16, a packet cycle counter 17 and a data input deciding section 18. The components 16 to 18 have the following functions.

First of all, the 47H data detecting section 16 has a first input terminal for receiving MPEG data output from the IEEE 1394 interface 1 and a second input terminal for receiving a clock generated and output from the IEEE 1394 interface 1, detects a synchronous word (Syncword) indicative of a head of an MPEG data packet, that is, a synchronous byte (8-bit signal) having a value of 47H (H implies a hexadecimal code) from the received MPEG data based on the clock to be a reference of the MPEG data, and generates and outputs a 1-bit detection signal when the synchronous byte 47H is detected.

On the other hand, the packet cycle counter 17 counts an interval of the detection signal output from the 47H data detecting section 16 (a time difference between a synchronous byte 47H and a next synchronous byte 47H) based on the clock and outputs a count value thus obtained.

The data input deciding section 18 monitors the count value output from the packet cycle counter 17, and outputs a 1-bit MPEG data detection signal (hereinafter referred to as a data detection signal) when deciding that the count value is equal to a count value (188) corresponding to one cycle (188 bytes) of the MPEG data packet (a specific data pattern appears every cycle), accordingly, that the input MPEG data are effectively present.

Next, description will be given to a series of operations in which the MPEG data recording apparatus according to the present embodiment detects the MPEG data output from the IEEE 1394 interface 1, records the MPEG data, and furthermore, stops the recording.

In the case in which the user operates the DTV 12 to record a digital broadcast (MPEG data) which is being received in the MPEG data recording apparatus, he (she) first establishes a connection between the DTV 12 and the MPEG data recording apparatus through the IEEE 1394 network 100 by using the control panel display provided in the DTV 12. In general, when the IEEE 1394 connection is established, an input/output data path is formed between both apparatuses and the DTV 12 starts to deliver, onto its own output path, the MPEG data which are being received. As a result, the IEEE 1394 interface 1 receives the MPEG data which are being delivered through a data path on the IEEE 1394 network 100. In this stage, however, the MPEG data recording apparatus does not start the recording operation. When the user carries out a recording start operation (press-down of a recording button or the like) through the control panel display after the establishment of the IEEE 1394 connection, the MPEG data recording apparatus starts the recording operation. Hereinafter, the "recording start operation" will be referred to as a "recording operation".

In FIGS. 1 and 2, the MPEG data detecting section 13 receives the input MPEG data and a clock to be a reference thereof through the IEEE 1394 interface 1 immediately (instantaneously) after the MPEG data which are being received are delivered subsequently to the establishment of the IEEE 1394 connection. As a result, the 47H data detecting section 16 detects a synchronous word indicative of the head of the MPEG data packet, that is, a synchronous byte having a value of 47H (H implies a hexadecimal code) from the input MPEG data based on the clock, generates a detection signal when the synchronous byte 47H is detected, and outputs the detection signal to the packet cycle counter 17. Upon receipt of the detection signal, the packet cycle counter 17 counts an interval of the detection signal output from the 47H data detecting section 16 based on the reference clock and outputs a count value to the data input deciding section 18. The data input deciding section 18 monitors the count value output from the packet cycle counter 17, and outputs an MPEG data detection signal to the buffer control section 15 if the received count value is a count value (188) corresponding to one cycle of the MPEG data packet.

FIG. 3 is a conceptual diagram showing an example of a communication between the DTV 12 and the MPEG data recording apparatus in the case in which the user carries out the recording operation (the press-down of the recording button or the like) by using the control panel display on the screen of the DTV 12. As shown in FIG. 3, when the MPEG data detecting section 13 outputs the MPEG data detection signal in response to the start of the output of the MPEG data from the DTV 12 before the recording operation, the buffer control section 15 outputs, to the FIFO buffer section 14, a first control signal for giving a command for buffer clearing the FIFO buffer section 14 and starting the FIFO operation in response to an input timing of the MPEG data detection signal. Consequently, the FIFO buffer section 14 starts the FIFO operation after the execution of the buffer clearing. Thus, the MPEG data received and output from the IEEE 1394 interface 1 are temporarily stored in the FIFO buffer section 14 sequentially. At this time, the buffer control section 15 outputs, to the D-VHS data processing section 2, a second control signal for giving a command for stopping the input of the output data of the FIFO buffer section 14. Therefore, the D-VHS data processing section 2 does not input data output from the FIFO buffer section 14, and therefore, does not start the recording operation.

When the user carries out the recording operation by using the control panel display or the like, the MPEG data recording apparatus or the IEEE 1394 interface 1 receives a recording control code transmitted from the DTV 12 with delay from the start of the transmission of the MPEG data. The received recording control code is transmitted from the IEEE 1394 interface 1 to the buffer control section 15. Consequently, the buffer control section 15 outputs, to the FIFO buffer section 14, a first control signal for giving a command for immediately outputting the temporarily stored MPEG data and outputs, to the D-VHS data processing section 2, a second control signal for giving a command for immediately inputting the data output from the FIFO buffer section 14 in response to the input timing of the recording control code. By the control, the FIFO buffer section 14 immediately carries out an operation for outputting the temporarily stored MPEG data and the D-VHS data processing section 2 immediately starts the operation for inputting the output data of the FIFO buffer section 14, thereby beginning the recording operation.

Next, description will be given to a recording stop operation of the MPEG data recording apparatus in the case in which the MPEG data recording apparatus starts to record the MPEG data in the above procedure and the user carries out the recording stop operation by using the control panel display or the like while the recording operation is being continuously executed.

First of all, in the case in which the user carries out the recording stop operation, the MPEG data recording apparatus receives a recording stop control code transmitted from the DTV 12 and the IEEE 1394 interface 1 transmits the recording stop control code to the buffer control section 15. Upon receipt of the recording stop control code, the buffer control section 15 outputs, to the FIFO buffer section 14, a first control signal for giving a command for stopping the data outputting operation of the FIFO buffer section 14 in a stage in which all the MPEG data which have already been input into the FIFO buffer section 14 when the recording stop control code is received are output to the D-VHS data processing section 2 and outputs, to the D-VHS data processing section 2, a second control signal for giving a command for stopping the recording operation in a stage in which all the MPEG data which have already been input into the FIFO buffer section 14 when the recording stop control code is received are recorded. By the control, the FIFO buffer section 14 stops the data output operation immediately after all the MPEG data which have already been input into the FIFO buffer section 14 at the time of receiving the recording stop control code are output and the D-VHS data processing section 2 stops the recording operation immediately after all the MPEG data which have already been input into the FIFO buffer section 14 at the time of receiving the recording stop control code are recorded.

Figure 8:
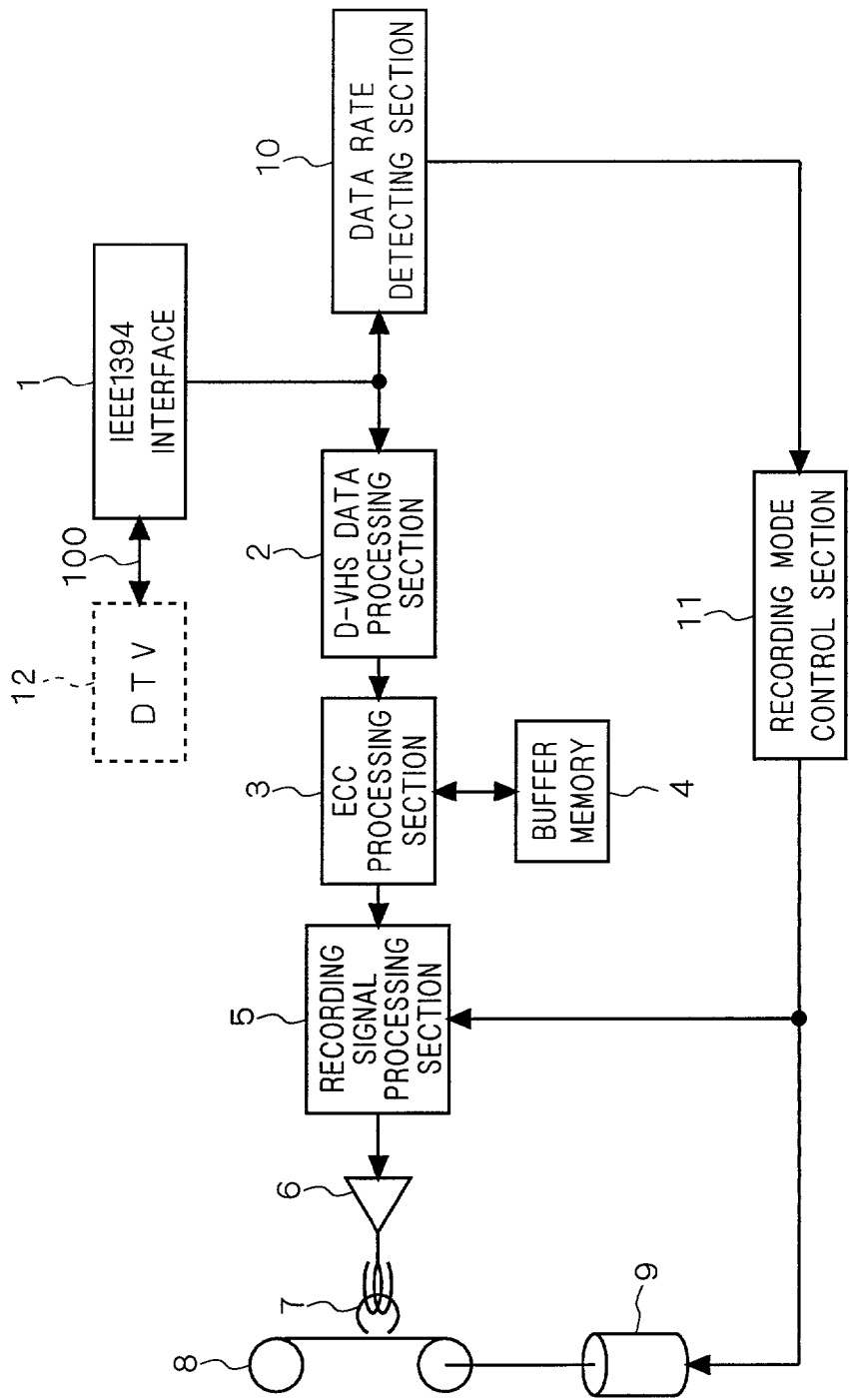
FIG. 8 is a block diagram showing a structure of a conventional MPEG data recording apparatus.
Figure 9:
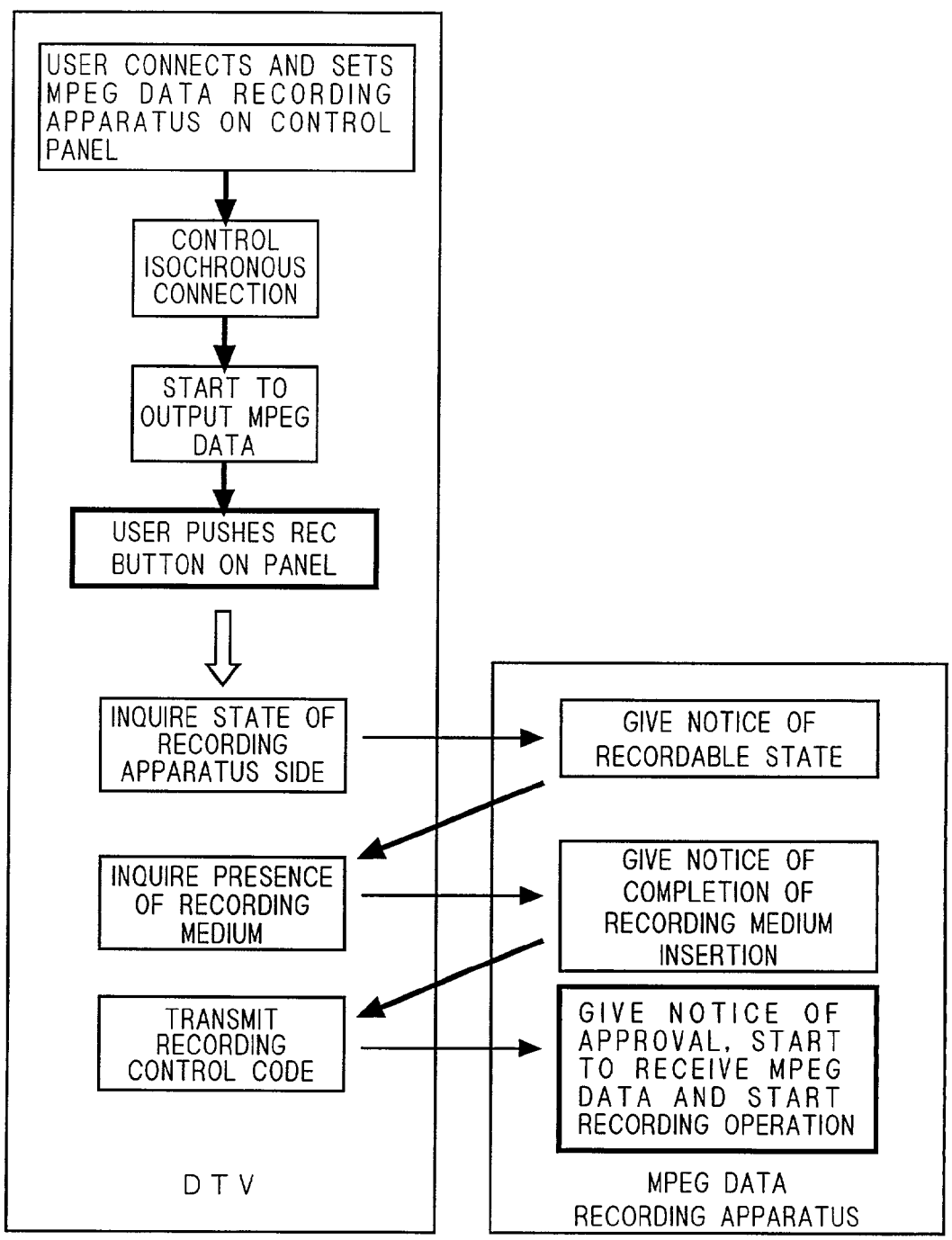
FIG. 9 is a conceptual diagram showing control through a user operation in the conventional MPEG data recording apparatus.

The operations of the sections 3 to 11 are the same as those of the corresponding sections in the conventional art shown in FIG. 8.

While the detection of the synchronous byte is utilized to detect a specific data pattern appearing every constant cycle in the present embodiment, another signal in the MPEG data packet may be utilized in place of the detection of the synchronous byte.

As described above, according to the MPEG data recording apparatus of the present embodiment, the MPEG data input through the IEEE 1394 interface 1 are continuously stored and updated in the FIFO buffer section 14 before the recording operation of the user. Therefore, the MPEG data can be recorded when the user carries out the recording operation or in the vicinity thereof. According to the present apparatus, furthermore, the recording operation of the MPEG data can be stopped when the user carries out the recording stop operation or in the vicinity thereof.

Second Embodiment

As described above, an IEEE 1394 interface 1 receives distributed MPEG data transmitted from a DTV 12, and then recomposes the MPEG data thus received and outputs the recomposed MPEG data. In that case, the IEEE 1394 interface 1 generates a flag indicating that a current signal is the MPEG data, that is, an MPEG data valid signal and outputs the flag signal. In the present embodiment, an MPEG data detecting section surely detects the presence of the MPEG data by positively utilizing the MPEG data valid signal. An MPEG data recording apparatus according to the present embodiment will be described below with reference to FIGS. 1 and 4. The present embodiment features only a structure of an MPEG data detecting section 13. Therefore, the description of the structures and operations of other components in FIG. 1 will be omitted.

Figure 4:
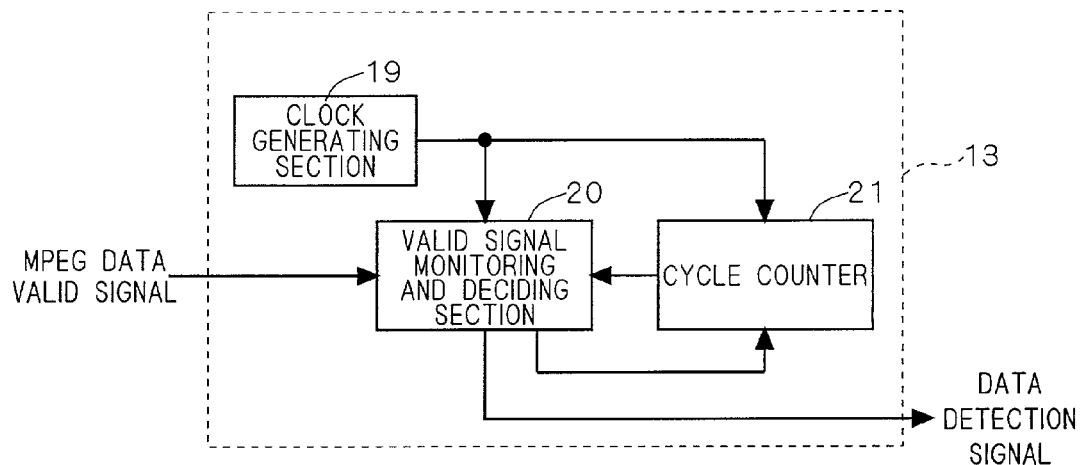
FIG. 4 is a block diagram showing a structure of an MPEG data detecting section according to the second embodiment of the present invention.

FIG. 4 is a block diagram showing the structure of the MPEG data detecting section 13 according to the present embodiment. In FIG. 4, a clock generating section 19 serves to generate a clock to be used for monitoring a detection time or a duration (valid period) and a disappearance time (invalid time) of an MPEG data valid signal. Moreover, a valid signal monitoring and deciding section 20 has a first input terminal for receiving an MPEG data valid signal, a second input terminal for receiving the clock and a third input terminal for receiving a period reference signal which will be described below, and has the function of monitoring the duration and disappearance time of the MPEG data valid signal based on the clock and deciding whether or not the valid MPEG data are input. The MPEG data valid signal is a signal (flag) indicating that the MPEG data are input validly as described above. Furthermore, a cycle counter 21 is a portion for informing the valid signal monitoring and deciding section 20 of an upper limit value of the disappearance time of the MPEG data valid signal preset therein to be the period reference signal.

Next, an operation of the MPEG data detecting section 13 in FIG. 4 will be described with reference to FIGS. 1 and 4. First of all, an MPEG data valid signal indicative of a valid area of input MPEG data is input from the IEEE 1394 interface 1 to an input terminal of the MPEG data detecting section 13. Upon receipt of the MPEG data valid signal, the valid signal monitoring and deciding section 20 detects the MPEG data valid signal input after a constant period or more for which the MPEG data valid signal cannot be input based on a clock output from the clock generating section 19, thereby resetting the cycle counter 21. Then, the valid signal monitoring and deciding section 20 counts a valid period and an invalid period of the MPEG data valid signal based on the clock. On other hand, the cycle counter 21 generates the period reference signal based on a preset value corresponding to the valid period and the invalid period, that is, an upper limit value of the invalid period of the MPEG data valid signal, and outputs the period reference signal to the valid signal monitoring and deciding section 20. Upon receipt of the period reference signal, the valid signal monitoring and deciding section 20 monitors the case in which the valid period is too short or the invalid period is too long based on the period reference signal, and decides that the MPEG data are present validly if these states are not detected, thereby generating a 1-bit data detection signal to be output to a buffer control section 15. Consequently, also in the case in which a user turns OFF a power source of the DTV12 or switches a channel of the DTV12 (in this case, the invalid period is extremely prolonged), for example, it is possible to avoid such a situation that an FIFO buffer section 14 carries out a temporary storage operation of the MPEG data.

In the MPEG data recording apparatus according to the present embodiment, operations other than the foregoing are the same as those of the MPEG data recording apparatus according to the first embodiment.

According to the present embodiment, as described above, the MPEG data input through the IEEE 1394 interface 1 are continuously stored and updated in the FIFO buffer section 14 before the recording operation of the user. Therefore, when the user carries out the recording operation or in the vicinity thereof, the MPEG data can be recorded. According to the present apparatus, furthermore, when the user carries out a recording stop operation, the operation for recording the MPEG data can be stopped when the user carries out the recording stop operation or in the vicinity thereof.

Third Embodiment

An MPEG data recording apparatus according to the present embodiment will be described with reference to FIGS. 1 and 5. The present embodiment features only a structure of an MPEG data detecting section 13 in the same manner as in the second embodiment. Therefore, the description of the structures and operations of other components in FIG. 1 will be omitted.

Figure 5:
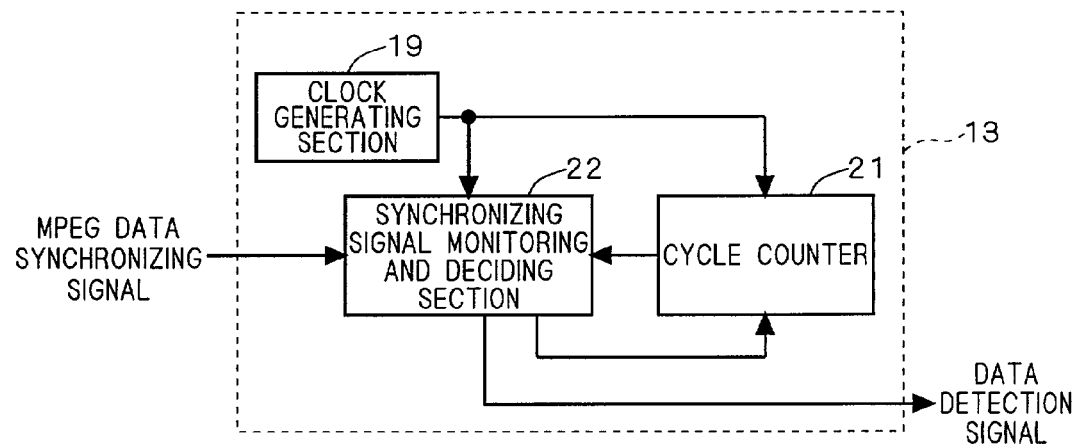
FIG. 5 is a block diagram showing a structure of an MPEG data detecting section according to the third embodiment of the present invention.

FIG. 5 is a block diagram showing the structure of the MPEG data detecting section 13 according to the present embodiment. In FIG. 5, a synchronizing signal monitoring and deciding section 22 serves to detect an MPEG data synchronizing signal (synchronous byte) indicative of a position of synchronous data positioned on a head of an MPEG data packet to be input, to monitor an interval of generation of the MPEG data synchronizing signal and to decide whether or not valid MPEG data are input. In FIG. 5, the same reference numerals as those in FIG. 4 denote functional units having the same functions as those of the corresponding portions in FIG. 4.

Referring to FIGS. 1 and 5, next, an operation of the MPEG data detecting section 13 according to the present embodiment will be described. First of all, an MPEG data synchronizing signal indicative of a head of an input MPEG data packet is input from an IEEE 1394 interface 1 to the MPEG data detecting section 13. Upon receipt of the MPEG data synchronizing signal, the synchronizing signal monitoring and deciding section 22 detects the MPEG data synchronizing signal input after a constant period or more for which the MPEG data synchronizing signal cannot be input based on a clock input from a clock generating section 19 and resets a cycle counter 21. Then, the synchronizing signal monitoring and deciding section 22 counts an interval of detection of the MPEG data synchronizing signal based on the clock. On the other hand, the cycle counter 21 has an allowable value (188 bytes) preset in a relationship with the MPEG data synchronizing signal, and generates a period reference signal based on the allowable value and outputs the period reference signal to the synchronizing signal monitoring and deciding section 22. Upon receipt of the period reference signal, the synchronizing signal monitoring and deciding section 22 detects that a detection cycle of the MPEG data synchronizing signal is much shorter than the allowable value or not based on the period reference signal, and decides that the MPEG data are present validly and outputs a 1-bit data detection signal to a buffer control section 15 except for the case in which the detection cycle is too short. Also in the case in which the detection cycle of the MPEG data is too short for some reason, consequently, it is possible to avoid such a situation that an FIFO buffer section 14 carries out an operation for temporarily storing the MPEG data.

As described above, the MPEG data detecting section 13 according to the present embodiment detects the presence of the MPEG data synchronizing signal which is synchronous with the MPEG data and a state in which the synchronizing signal appears every constant cycle, thereby deciding that the MPEG data are present validly and outputting the data detection signal.

In the MPEG data recording apparatus according to the present embodiment, operations other than the foregoing are the same as those of the MPEG data recording apparatus according to the first embodiment.

According to the present embodiment, as described above, the MPEG data input through the IEEE 1394 interface 1 are continuously stored and updated in the FIFO buffer section 14 before the recording operation of the user. Therefore, when the user carries out the recording operation or in the vicinity thereof, the MPEG data can be recorded. According to the present apparatus, furthermore, when the user carries out a recording stop operation, the operation for recording the MPEG data can be stopped when the user carries out the recording stop operation or in the vicinity thereof.

Fourth Embodiment

Figure 6:
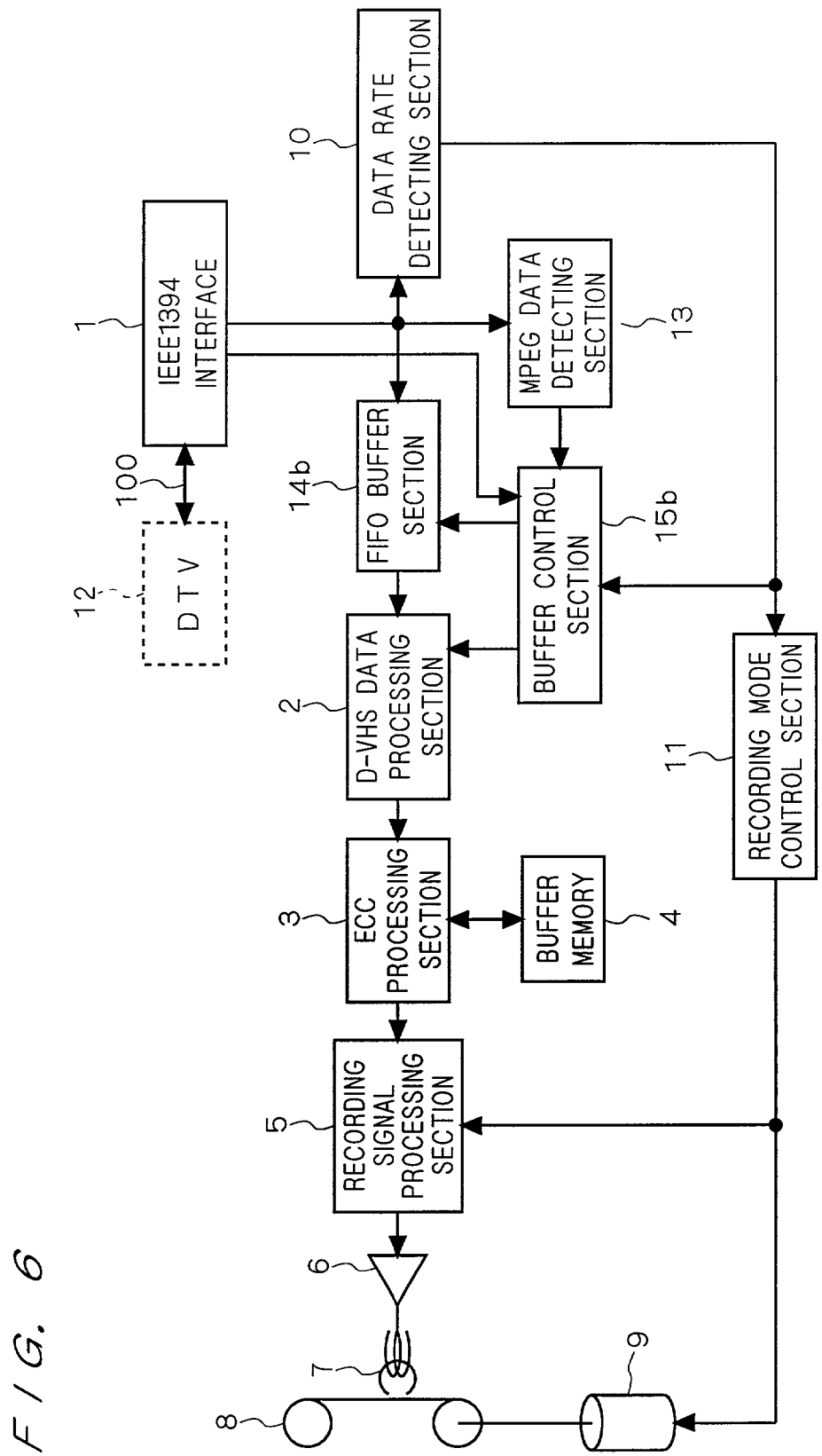
FIG. 6 is a block diagram showing a structure of the MPEG data recording apparatus according to the fourth embodiment of the present invention.
Figure 7:
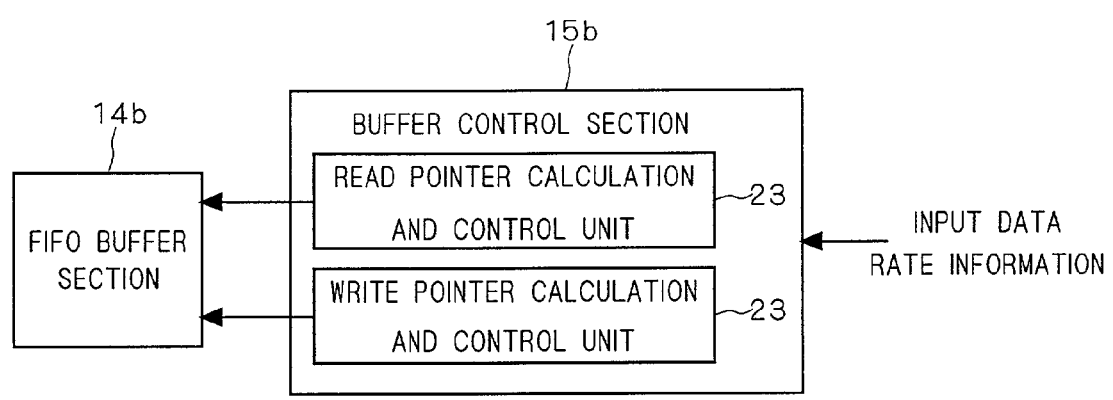
FIG. 7 is a block diagram showing structures of an FIFO buffer section and a buffer control section according to the fourth embodiment of the present invention.

An MPEG data recording apparatus according to the present embodiment will be described with reference to FIGS. 6 and 7. FIG. 7 is a block diagram showing structures of a buffer control section and an FIFO buffer section in the MPEG data recording apparatus according to the present embodiment. In FIG. 6, functional units 1 to 13 having the same reference numerals as those of FIG. 1 according to the first embodiment have the same functions as those of the corresponding portions in FIG. 1.

In FIG. 6, a buffer control section 15b has the same function as that of the buffer control section 15 in FIG. 1 and also has an input terminal connected to an output terminal of a data rate detecting section 10, and consequently, has the function of updating values of a read pointer and a write pointer of an FIFO buffer section 14b based on data rate information transmitted from the data rate detecting section 10. Moreover, the FIFO buffer section 14b has the same function as that of the FIFO buffer section 14 in FIG. 1 and changes positions of the read pointer and the write pointer in response to a control signal for giving a command for updating the value of each of the pointers which is output from the buffer control section 15b.

In FIG. 7, a read/write pointer calculation and control unit 23 is a portion for changing a data volume to be stored and updated in the FIFO buffer section 14b based on the data rate information to be input.

In FIGS. 3, 6 and 7, a user carries out an operation for connecting the MPEG data recording apparatus to a DTV 12 by using a control panel display on the DTV 12 and the DTV 12 then starts to output MPEG data. As a result, an MPEG data detecting section 13 detects an input of the MPEG data and transmits a result of the detection as a data detection signal to the buffer control section 15b. At the same time, the input data rate information detected by the data rate detecting section 10 is also transmitted to the buffer control section 15b. As a result, the buffer control section 15b calculates a data volume to be stored and updated in the FIFO buffer section 14b based on the data rate information thus obtained and a delay time required while the user carries out a recording start operation and the buffer control section 15b then receives a recording control code actually.

For example, an MPEG data recording apparatus using HAVI (Home Audio Video Interoperability) can define a combination and order (command flow) of a control code for controlling itself. Therefore, it is possible to assume an operation flow from the recording start operation of the user to the actual receipt of the recording control code through the buffer control section. Consequently, such an MPEG data recording apparatus can predict the delay time so that an approximate data volume can be calculated.

Also in a general MPEG data recording apparatus using an AV/C command, moreover, it is possible to estimate an approximate delay time by previously carrying out estimation in a development stage.

The delay time assumed or estimated as described above is preset into the buffer control section 15b.

The buffer control section 15b can calculate a data volume to be stored and updated in the FIFO buffer section 14b by a multiplication of the delay time and the input data rate in response to the receipt of the data detection signal and the data rate information.

Next, the read/write pointer calculation and control unit 23 in the buffer control section 15b determines an address of each of the read pointer and the write pointer based on the calculated data volume and outputs a first control signal for giving a command for both addresses thus determined to the read pointer and the write pointer in the FIFO buffer section 14b, thereby setting the determined addresses to the FIFO buffer section 14b.

The FIFO buffer section 14b stores and updates the input MPEG data based on the pointer address thus set and stands by until a recording control code transmitted from the DTV 12 after the recording operation of the user is received by the buffer control section 15b.

The subsequent operation is the same as that in the first embodiment.

As described above, according to the present embodiment, the data rate of the MPEG data output from an IEEE 1394 interface 1 is detected and the detected data rate is multiplied by the delay time from the recording operation of the user to an actual operation which is assumed or estimated in response to the input of the data detection signal, thereby changing a stored data volume in the FIFO buffer section 14b. Consequently, it is possible to record the MPEG data and to stop the recording on a time which is much closer to a time that the recording operation of the user is to be carried out.

While the invention has been shown and described in detail, the foregoing description is in all aspects illustrative and not restrictive. It is therefore understood that numerous modifications and variations can be devised without departing from the scope of the invention.

What is claimed is:

1. An MPEG data recording apparatus comprising:

an IEEE 1394 interface having an input terminal connected to an external device and serving to receive MPEG data output from said external device and a recording control code output from said external device with delay after receiving said MPEG data and to output at least said MPEG data and said recording control code from an output terminal;

an MPEG data detecting section having an input terminal connected to said output terminal of said IEEE 1394 interface and serving to detect that said MPEG data are present validly or not and to output a data detection signal from an output terminal thereof when said MPEG data are present validly;

an FIFO buffer section having an input terminal connected to said output terminal of said IEEE 1394 interface and a control terminal and serving to temporarily store said MPEG data;

a data recording section having an input terminal connected to an output terminal of said FIFO buffer section and a control terminal and serving to record said MPEG data output from said FIFO buffer section; and a buffer control section having an input terminal connected to said output terminal of said IEEE 1394 interface and said output terminal of said MPEG data detecting section, and serving to output a signal for giving a command for starting an FIFO operation to said control terminal of said FIFO buffer section and to output a signal for giving a command for stopping a recording operation to said control terminal of said data recording section in response to receipt of said data detection signal, and to output a signal for giving a command for reading said MPEG data to said control terminal of said FIFO buffer section and to output a signal for giving a command for starting said recording operation to said control terminal of said data recording section in response to receipt of said recording control code.

2. The MPEG data recording apparatus according to claim 1, wherein said IEEE 1394 interface also receives and outputs a recording stop control code output from said external device with delay after receiving said recording control code, and said buffer control section outputs:

(i) a signal to said control terminal of said FIFO buffer section, in response to said receipt of said recording stop control code, for giving a command for stopping said FIFO operation after outputting all said MPEG data which have been stored in said FIFO buffer section when receiving said recording stop control code to said input terminal of said data recording section; and (ii) a signal to said control terminal of said data recording section, in response to said receipt of said recording stop control code, for giving a command for stopping said recording operation after recording all said MPEG data which have been stored in said FIFO buffer section when receiving said recording stop control code.

3. The MPEG data recording apparatus according to claim 2, wherein said IEEE 1394 interface generates a clock to be a reference of said MPEG data and outputs said clock together with said MPEG data from said output terminal, and said MPEG data detecting section receives said MPEG data and said clock and detects said MPEG data synchronously with said clock, thereby detecting that a specific data pattern appears every constant cycle or not and outputting said data detection signal when said specific data pattern appears.

4. The MPEG data recording apparatus according to claim 2, wherein said IEEE 1394 interface generates an MPEG data valid signal indicating that a received signal is said MPEG data and outputs said MPEG data valid signal together with said MPEG data from said output terminal, and said MPEG data detecting section detects that said MPEG data are present validly or not based on said MPEG data valid signal thus received.

5. The MPEG data recording apparatus according to claim 2, wherein said MPEG data detecting section detects presence of a signal synchronous with said MPEG data and a state in which said synchronizing signal appears every constant cycle, thereby deciding that said MPEG data are present validly to output said data detection signal.

6. The MPEG data recording apparatus according to claim 2, further comprising:

a data rate detecting section having an input terminal connected to said output terminal of said IEEE 1394 interface and serving to detect a data volume to be input per unit time as data rate information from said MPEG data, wherein said input terminal of said buffer control section is also connected to an output terminal of said data rate detecting section, said buffer control section has a delay time for which a user operates a control panel on said external device to issue a command for a recording start operation and said buffer control section then receives said recording control code, and said buffer control section multiplies said delay time by said data rate information to calculate said data volume to be stored and updated in said FIFO buffer section and determines addresses of a read pointer and a mite pointer of said FIFO buffer section based on said data volume thus calculated, thereby setting said determined addresses to said FIFO buffer section in response to receipt of said data detection signal and said data rate information.

7. An MPEG data recording apparatus comprising:

an IEEE 1394 interface having an input terminal connected to an external device and serving to receive MPEG data output from said external device and a recording control code output from said external device with delay after receiving said MPEG data and to output at least said MPEG data and said recording control code from an output terminal;

MPEG data detecting means, having an input terminal connected to said output terminal of said IEEE 1394 interface, for detecting that said MPEG data are present validly or not and for outputting a data detection signal from an output terminal thereof when said MPEG data are present validly;

FIFO buffer means, having an input terminal connected to said output terminal of said IEEE 1394 interface and a control terminal, for temporarily storing said MPEG data;

data recording means, having an input terminal connected to an output terminal of said FIFO buffer means and a control terminal, for recording said MPEG data output from said FIFO buffer means; and buffer control means, having an input terminal connected to said output terminal of said IEEE 1394 interface and said output terminal of said MPEG data detecting means, for outputting a signal for giving a command for starting an FIFO operation to said control terminal of said FIFO buffer means and outputting a signal for giving a command for stopping a recording operation to said control terminal of said data recording means in response to receipt of said data detection signal, and for outputting a signal for giving a command for reading said MPEG data to said control terminal of said FIFO buffer means and outputting a signal for giving a command for starting said recording operation to said control terminal of said data recording means in response to receipt of said recording control code.

8. The MPEG data recording apparatus according to claim 7, wherein
said IEEE 1394 interface also receives and outputs a recording stop control code output from said external device with delay after receiving said recording control code, and
said buffer control means outputs:
(i) a signal to said control terminal of said FIFO buffer means, in response to said receipt of said recording stop control code, for giving a command for stopping said FIFO operation after outputting all said MPEG data which have been stored in said FIFO buffer means when receiving said recording stop control code to said input terminal of said data recording means; and
(ii) a signal to said control terminal of said data recording means, in response to said receipt of said recording stop control code, for giving a command for stopping said recording operation after recording all said MPEG data which have been stored in said FIFO buffer means when receiving said recording stop control code.

* * * * *